Sept. 9, 1958 W. M. WEBSTER, JR 2,851,592

CARRIER WAVE POWERED RADIO TRANSCEIVER CIRCUITS

Filed Dec. 3, 1952

INVENTOR
William M. Webster, Jr.
BY
H. R. Weston
ATTORNEY

United States Patent Office 2,851,592

Patented Sept. 9, 1958

2,851,592

CARRIER WAVE POWERED RADIO TRANSCEIVER CIRCUITS

William M. Webster, Jr., Princeton, N. J., assignor to Radio Corporation of America, a corporation of Delaware Application December 3, 1952, Serial No. 323,783

17 Claims. (Cl. 250—13)

This invention relates to high frequency combined transmitters and receivers or transceivers for radio communication and the like, and has for its primary object to provide an improved radio transceiver or like device which may derive power for operation from a received signal or otherwise be carrier wave powered.

Transceiver systems find wide application in military, police and civilian defense work where information must be sent to or received from a central command post. In each of these fields of operation it is generally necessary to maintain the transceiver devices in the field in standby condition, that is, in such a condition as to receive signals at all times. This results in the consumption of considerable power, and where batteries must be employed to supply operating power they must be replaced or serviced constantly.

Radio transceivers are also supplied as part of life raft and aircraft equipment to transmit S O S signals in cases of emergency. It is apparent that such signals can only be transmitted as long as the power source is not dissipated or run down.

The requirements of a transceiver adapted for application to the above and similar fields of use may also include compactness and lightness for purposes of mobility without fatigue to the user. In addition, a constant source of power, preferably without appreciable weight and having a relatively long life time must be available for its operation.

It is, therefore, a further object of this invention to provide an improved radio transceiver or transceiver system which effectively may employ transistors and which may receive and utilize operating power from radio signals or other carrier wave energy.

It is a further object of this invention to provide a compact radio transceiver that is independent of any power connection or battery for operation, that has relatively long operating life and that requires a minimum of maintenance.

Another object of this invention is to provide a radio transceiver which is self contained and which combines efficient operation with compactness and light weight.

In accordance with the present invention, a radio transceiver is provided with circuit means for receiving and transmitting high-frequency modulated carrier waves with power derived from the same or other radiation wave energy. The received carrier wave may have a fixed or predetermined frequency $f_1$, and the transmitted wave may have another predetermined frequency $f_2$ which has a value above or below the frequency of the received wave $f_1$. An oscillator circuit including a semiconductor device or transistor adapted to transmit the carrier wave of frequency $f_2$ is incorporated in the radio transceiver and suitable biasing voltages or circuits are provided for operation of the transistor. The transistor biasing voltages or currents are derived from the received modulated carrier wave as above indicated, and to this end a non-linear conducting device, such for example, as a vacuum or crystal rectifier, rectifies the received carrier wave. A portion of the rectified wave provides a direct current D.-C. potential across a capacitor, which potential in turn is utilized to bias the transistor circuits for most efficient operation.

In a further embodiment in accordance with the invention, means are provided for selectively causing the transistor or transistors to operate as part of a regenerative receiver circuit whereby greater signal sensitivity may be had than is available when employing a simple crystal receiver. In this further embodiment, a central transmitter may provide an unmodulated wave of frequency $f_1$, which may be received and rectified to provide the transistor biasing or operating energy while intelligence is received and transmitted on a carrier wave of frequency $f_2$.

The novel features that are considered characteristic of this invention are set forth with particularity in the appended claims. The invention itself, however, both as to its organization and method of operation as well as additional objects and advantages will best be understood from the following description when read in connection with the accompanying drawing in which:

Figure 1:
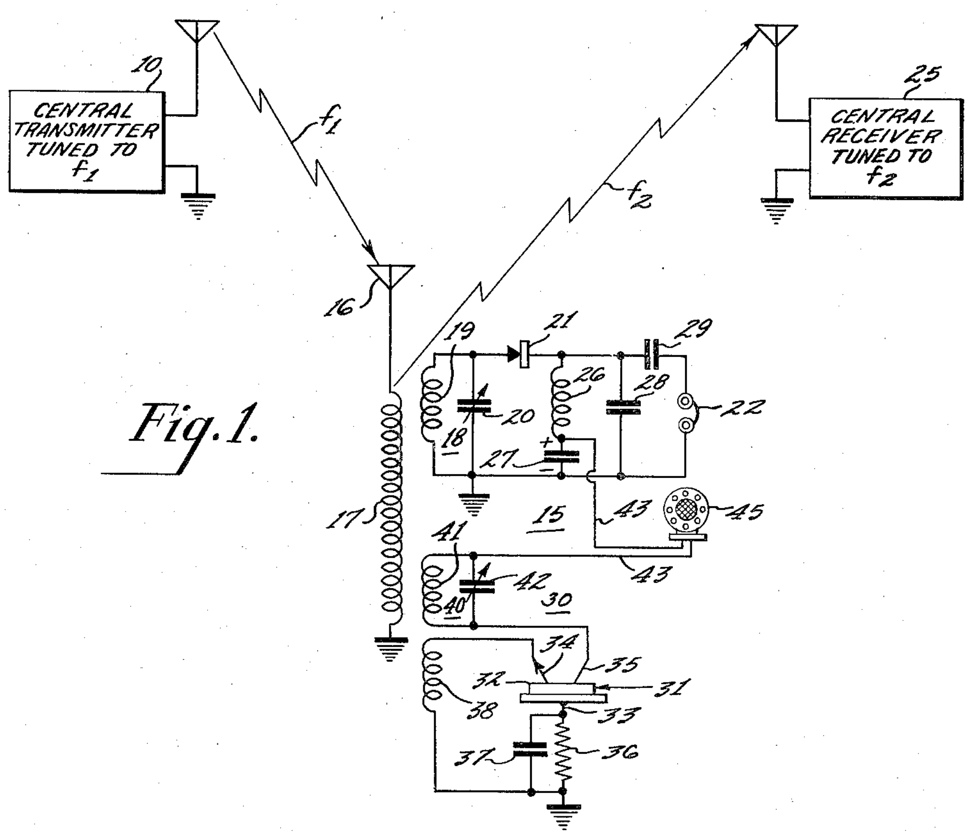
Figure 1 is a schematic diagram of a communications system including a schematic circuit diagram of a transceiver embodying the present invention.

Referring to the drawing in which like reference characters identify like elements throughout the various figures, and with particular reference to Figure 1, a high-frequency central transmitter diagrammatically represented at 10 is adapted to transmit high-frequency modulated carrier waves at predetermined frequencies selectable with a relatively wide frequency spectrum and may, by way of example, transmit a carrier wave having a frequency $f_1$. A transceiver generally indicated at 15 is adapted to receive the carrier waves from the transmitter 10 and to transmit a modulated carrier wave having a selected frequency $f_2$. A central receiver diagrammatically indicated at 25 is tunable to and adapted to receive the carrier wave of frequency $f_2$. It is to be understood that the radio communications systems of Figure 1 may include a single central transmitter, a single central receiver and a plurality of transceivers similar to the transceiver 15.

Referring particularly to the transceiver 15, a radio antenna 16 or other suitable means for intercepting carrier waves is connected to ground through an inductor 17. The antenna 16 may be untuned and is, therefore, adapted to receive or to transmit carrier waves lying within a relatively wide frequency spectrum. A tunable signal selecting circuit 18, including an inductor 19 and a variable capacitor 20 connected in parallel, is coupled to the inductor 17 and absorbs energy of frequency $f_1$, for example, from inductor 17. One side of the signal selective circuit 18 may be grounded as shown. The received energy is rectified or detected by a rectifier 21 which is connected to the tunable circuit 18 and which may be any non-linear conducting device such as a vacuum tube rectifier but is preferably a crystal rectifier and may be, for example, of the commercial 1N72 type. In order to convert the received and rectified energy into an audible signal, an audio frequency reproducing device 22, such for example, as a pair of headphones or other high resistance sound reproducer is connected in series with the circuit 18 and the rectifier 21.

A direct current voltage is derived from the rectified energy by means of a storage or filter circuit including a choke coil or inductor 26 connected in series with a storage capacitor 27. The filter circuit and the rectifier 21 are connected in series arrangement in shunt with circuit 18.

Upon rectification of the received carrier wave, a current passes through the filter circuit and develops a charge on or potential across the capacitor 27 which is the source of biasing voltage for the transistor circuits in the transceiver such as a transistor oscillator hereinafter described. A shunt capacitor 28 across the rectifier output circuit provides a low reactance path to radio frequency R.-F. currents, and a further capacitor 29 blocks the flow of D.-C. current through the headphones 22. The inductor 26 functions to maintain a relatively steady potential across the storage capacitor 27, while the potential across the capacitor 28 varies in accordance with the modulation of the received signal.

A transmitter oscillator circuit generally designated at 30 includes a semi-conductor device or transistor 31 comprising a body 32 of semi-conductive material such, for example, as germanium. The semi-conducting material may be either of the N type or the P type depending upon whether there is an excess of electrons (negative carriers) or holes (positive carriers) normally present in the material. A base electrode 33 is in low-resistance contact with the body 32 and a pair of electrodes 34 and 35 are in rectifying contact with the body 32.

The base electrode 33 is connected to a terminal common to the electrodes 34 and 35 or to ground through a biasing resistor 36 which is shunted by a signal bypass capacitor 37. The emitter electrode 34 is connected to ground through a tickler coil or feedback inductor 38. The oscillator tank circuit 40 comprises an inductor 41 in shunt with a variable capacitor 42 and is connected in circuit with the collector electrode 35. The tank circuit 40 may be tuned by the capacitor 42 to a frequency $f_2$ and is inductively coupled with the antenna inductor 17 to provide for radiation of the oscillator energy. A biasing voltage is supplied between the collector electrode 35 and the base electrode 33 through a conductor 43 from the high voltage side of the storage capacitor 27 and the tunable tank circuit 40. A modulating element such, for example, as the microphone 45 is connected between the source of bias voltage, capacitor 27, and the collector electrode 35.

If the semi-conducting body 32 is of N type material, either of the rectifying electrodes 34 or 35 may be biased in the forward direction or direction of easy current flow if the rectifying electrode is positive with respect to the base electrode, and may be biased in the reverse direction if the rectifying electrode is negative with respect to the base. If the material is of the P conductivity type, either rectifying electrode may be biased in the forward direction if it is negative with respect to the base and will be biased in the reverse direction if it is positive with respect to the base.

The polarity of the collector electrode biasing voltage is determined by the connections to the rectifier 21 with respect to the capacitor 27. As illustrated in Figure 1, a positive voltage, with respect to ground, will build up across the capacitor 27 resulting in a reverse biasing voltage on the collector electrode 35, the body 32 being assumed by way of example, to be of the P conductivity type.

Figure 2:
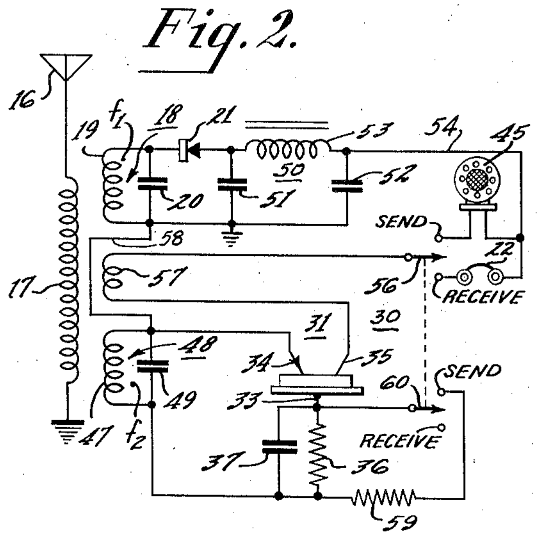
Figure 2 is a schematic circuit diagram of a similar transceiver and illustrating a further embodiment of the present invention.

If the rectifier 21 were reversed, as shown in Figure 2, for example, and as hereinafter described, a potential which is negative with respect to ground would be developed across the capacitor 27, and the collector electrode would be biased in the reverse direction provided the body 32 is of the N conductivity type.

The collector electrode current flowing through the resistor 36 places the base electrode 33 at a potential which is positive with respect to the emitter electrode 34 in the case of a P conductivity type body and makes the base negative with respect to the emitter in the case of an N conductivity type body. This is due to the fact that the steady state current flows into the P type body and out of the N type body. In either event, the emitter electrode 34 is biased in a forward direction or direction of easy current flow.

The tank circuit 40 as was above stated is inductively coupled to the antenna 16 through the inductor 17 to provide antenna radiation of the oscillator energy and is further coupled to the feedback inductor 38 to feed back a part of the output signal to the emitter circuit to provide self sustained oscillation. An oscillator circuit of this general type has been disclosed, for example, in Figure 12 of the United States patent of Bardeen et al. 2,524,035 granted on October 3, 1950.

With the oscillator energized or biased for operation under the conditions above described, carrier waves of a frequency equal to that of the oscillations are radiated or transmitted from the antenna 16. The transmitted carrier waves are modulated by means of the microphone 45 or other variable impedance element which varies the effective collector electrode voltage thereby varying the amplitude of the output carrier wave.

The transceiver in accordance with the present invention illustrated in Figure 1, is thus seen to include two main sections. The receiver section which includes the signal selective input circuit 18, the rectifier 21, the capacitors 28 and 29, and the signal output means 22. The receiver section operates in a manner similar to that of conventional crystal receivers.

The transmitter section comprises the transistor oscillator 30 which includes the transistor 31, the feedback inductor 38, the tunable tank circuit 40 and the microphone 45. Common to the receiver and transmitter circuits is the filter circuit including the choke coil 26 and the storage capacitor 27 across which the transistor biasing or operating voltage is developed from the rectified carrier wave.

Referring now to Figure 2, the antenna 16 is connected to ground through the inductor 17 which is coupled to the signal selective circuits 18 and 48. In this embodiment the signal selective circuit 48 is the oscillator tank circuit which includes an inductor 47 and a capacitor 49 illustrated as being fixed tuned, but which may be tunable as is the signal selective receiver input circuit 18.

The rectifier 21 is connected between the input circuit 18 and a filter circuit 50 which includes a pair of storage capacitors 51 and 52, and a filter or choke coil 53. The headphones 22 and the microphone 45 each have one terminal connected through the common conductor 54 to one side of the storage capacitor 52. The other terminal of the headset and the other terminal of the microphone are adapted to be selectively connectable to the collector electrode 35 through the inductor 57 by means of the switch 56.

The emitter electrode 34 is directly connected to ground through the return conductor 58 and is further connected to the base electrode 33 through the tuned tank circuit 48 and a biasing network which includes the biasing resistor 36 and the bypass capacitor 37. A further biasing resistor 59 is adapted to be selectively connected in shunt with the resistor 36 by means of the switch 60. The switch 60 is preferably ganged to switch 56 as indicated by the dotted line 61.

The embodiment of Figure 2 in accordance with the present invention differs in operation from that of Figure 1 in that the transistor 31 is employed in the receiver circuit as well as in the transmitter circuit of the transceiver. Intelligence is received and transmitted on a modulated carrier wave of frequency $f_2$, and operating energy is provided by a received and rectified wave of frequency $f_1$. The point of origin of the received wave $f_1$ may be one or more similar transceivers. The received wave of frequency $f_1$ need not be modulated since its function is to provide energy from which the biasing voltage developed across the capacitor 52 is derived.

With the switches 56 and 60 in the "Receive" position, an operating biasing voltage for the transistor 31 is applied between the collector electrode 35 and base electrode 33 through the headphones 22, switch 56, inductor 57, transistor 31, resistor 36, and inductor 47. The time constant of the biasing network including the resistor 36 and the capacitor 37 is such that the transistor 31 oscillates intermittently at a frequency $f_2$ as determined by the tank circuit 48; a part of the output voltage being fed back to the emitter electrode circuit due to inductive coupling between the inductor 57 and the inductor 47. The receiver circuit which includes the headset 22, the transistor 31, the selective circuit 48 and the feedback inductor 57 thus operates as a regenerative receiver and provides a higher sensitivity than is provided by the receiver circuit in the embodiment of Figure 1.

With the switches 56 and 60 in the "Send" position, the operating biasing voltage is applied from the capacitor 52 to the collector electrode 35 through the microphone 45 and the inductor 57. At the same time, the biasing resistor 59 is connected in shunt with the resistor 36 through the switch 60. The parallel arrangement of the resistors 36 and 59 reduces the value of the resistance in the biasing network and thereby reduces the time constant of the biasing network. As a result, the transistor 31 sustains oscillations of frequency $f_2$. These oscillations are fed to the antenna 16 by means of the coupling between the tank circuit 48 and the antenna inductor 17 and are, therefore, radiated by the antenna 16. A modulation signal may be applied to the carrier wave oscillations by means of the microphone 45 which varies the impedance of the collector electrode circuit.

It is thus apparent that with the transceiver of Figure 2 employed in the system of Figure 1, the central transmitter 10 will provide energy from which the operating power for the transceiver is derived in accordance with the present invention.

The central receiver 25 receives signals from one or more of the transceivers. In addition, intelligence may be exchanged between points at which the individual transceivers are located. Groups of transceivers may be allocated different operating frequencies in which case the central receiver may be tunable to the allocated frequencies and thereby correlate information received from the various groups of transceivers.

Figure 3:
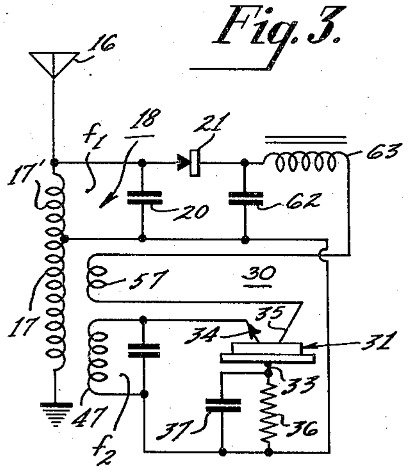
Figure 3 is a schematic circuit diagram of another transceiver constructed and operative in accordance with the present invention.

Referring now to Figure 3, there is shown a further embodiment of a transceiver device in accordance with the present invention. The input circuit 18 comprises a portion 17′ of the inductor 17 which is shunted by the capacitor 20 for tuning to a signal of frequency $f_1$. The voltage developed across a filter capacitor 62 is applied to the collector electrode 35 through a filter choke 63 and an oscillator feedback inductor 57. There is no audio signal reproducing means or modulating means in the embodiment of Figure 3. The received carrier wave is rectified by the rectifier 21 to develop a biasing voltage across the filter capacitor 62. The modulation signal of the received carrier wave appears across the filter capacitor 62 and thereby varies the bias voltage applied to the collector electrode 35. The transmitted carrier wave of frequency $f_2$, as determined by the oscillator tunable tank circuit 48, is accordingly modulated by the received signal. A transceiver device as illustrated in Figure 3 is particularly adapted for such systems as friend-foe identification systems, or as emergency signal equipment in aircrafts or life rafts.

From the foregoing description of the invention in connection with several embodiments thereof, it will be seen that a transceiver in accordance with the invention, is provided with an oscillator or signal generator circuit having a semi-conductor device or transistor which is biased from a voltage derived from a portion of the received carrier wave. As a result, with a crystal type receiver circuit, no local source of power is required to operate the transceiver. The resulting device is compact, efficient, and requires little maintenance.

What is claimed is:

1. In a transceiver, the combination of a carrier wave receiving circuit, carrier wave rectifying means coupled to said receiving circuit, a storage capacitor connected in circuit with said rectifying means and said receiving circuit to form a closed unilaterally conducting loop and adapted to be charged by a unidirectional current from said rectifying means, a semi-conductor device having at least a collector electrode, an emitter electrode and a base electrode, a biasing network including a resistor and a bypass capacitor connected between said base electrode and a point of fixed reference potential, and circuit means connecting said storage capacitor between said collector and said point of fixed reference potential, the charge on said storage capacitor in response to a received carrier wave providing the sole biasing supply for said semi-conductor device.

2. In a transceiver, the combination of a carrier wave receiving circuit including a parallel resonant tuned circuit, rectifying means connected to said parallel resonant tuned circuit, a storage capacitor connected in circuit in a closed unilaterally conducting circuit with said rectifying means and said parallel resonant tuned circuit and adapted to be charged by a unidirectional current from said rectifying means, a semi-conductor device having at least a collector electrode, an emitter electrode and a base electrode, a first inductor connected between said emitter electrode and said base electrode, and circuit means including a second inductor coupled to said first inductor and connecting said capacitor between said collector electrode and said base electrode whereby said collector is biased with respect to said base electrode.

3. In a transceiver, the combination of a receiving circuit including a frequency selective means, rectifying means connected to said frequency selective means, a storage capacitor connected in circuit in a unilaterally conducting closed loop with said rectifying means and said frequency selective means and adapted to be charged by a unidirectional current from said rectifying means, a semi-conductor device having at least a collector electrode, an emitter electrode and a base electrode, a biasing network including a resistor and a bypass capacitor connected to said base electrode, a first inductor connected between said emitter electrode and said biasing network, and circuit means including a second inductor coupled to said first inductor and connecting said storage capacitor between said collector electrode and said biasing network whereby said collector is biased with respect to said base electrode.

4. In a transceiver, the combination as defined in claim 3 wherein said circuit means includes a variable impedance element.

5. In a high frequency transceiver the combination comprising an antenna adapted to receive and transmit carrier waves of predetermined frequency selectable within a relatively wide frequency spectrum, a parallel resonant circuit inductively connected to said antenna and resonant to carrier waves of a first selected frequency, a rectifying element connected to said circuit, an energy storage means including a filter coil and a storage capacitor connected in shunt with said rectifying element and said resonant circuit, a semi-conductor device having at least an emitter, a collector and a base electrode, circuit means connecting said storage capacitor between said collector and said base electrode, and voltage feedback means coupled between said collector and said emitter including a portion of said circuit means, said feedback means including a further parallel resonant circuit coupled to said antenna and resonant to carrier waves of a second selected frequency.

6. In a high frequency transceiver, the combination comprising an antenna adapted to receive and transmit carrier waves of predetermined frequency selectable within a relatively wide frequency spectrum, a parallel resonant circuit coupled to said antenna and resonant to carrier waves of a first selected frequency, a rectifying element connected to said circuit, energy storage means including a filter coil and a storage capacitor connected in shunt with said rectifying element and said resonant circuit, a transistor device having at least an emitter, a collector and a base electrode, a biasing network connected between said base electrode and a terminal common to said emitter and collector, circuit means connecting said storage capacitor between said collector and said biasing network, and voltage feedback means coupled between said collector and said emitter, said feedback means including a further parallel resonant circuit coupled to said antenna and resonant to carrier waves of a second selected frequency.

7. In a high frequency transceiver the combination comprising an antenna adapted to receive and transmit modulated carrier waves of predetermined frequency selectable within a relatively wide frequency spectrum, a first inductor connecting said antenna to a point of fixed potential, a first parallel resonant circuit coupled to said first inductor and resonant to carrier waves of a first selected frequency, rectifying means connected to said circuit, energy storage means including a filter coil and a storage capacitor serially connected across said rectifying means and said resonant circuit, a transistor device having at least an emitter, a collector and a base electrode, a biasing network connected between said base electrode and said point of fixed potential, a second inductor connected between said emitter and said point of fixed potential, means including a further parallel resonant circuit mutually coupled to said first and said second inductors connecting said storage capacitor between said collector and said point of fixed potential, said further parallel circuit being resonant to carrier waves of a second selected frequency.

8. In a high frequency transceiver the combination as defined in claim 6 wherein a sound reproducer is connected in circuit with said rectifying means.

9. In a high frequency transceiver the combination as defined in claim 6 wherein said means connecting said storage capacitor between said collector and said point of fixed potential further includes a variable impedance element.

10. In a high frequency transceiver the combination comprising an antenna adapted to receive and transmit carrier waves of predetermined frequency selectable within a relatively wide frequency spectrum, a first inductor connecting said antenna to a point of fixed potential, a first parallel resonant circuit coupled to said first inductor and resonant to carrier waves of a first selected frequency, a rectifying element connected to said circuit, energy storage means including a filter coil and a storage capacitor serially connected in shunt with said rectifying element and said resonant circuit, a transistor device having at least an emitter, a collector and a base electrode, a biasing network connected between said base electrode and said point of fixed potential, a second parallel resonant circuit connected between said emitter and said point of fixed potential, said second parallel circuit being coupled to said first inductor and resonant to carrier waves of a second selected frequency, and means including a second inductor coupled to said second parallel resonant circuit connecting said storagee capacitor between said collector and said point of fixed potential.

11. In a high frequency transceiver the combination as defined in claim 10 wherein said biasing network comprises a parallel connected resistor and bypass capacitor and a further resistor is adapted to be selectively connectable across said biasing network.

12. In a high frequency transceiver the combination as defined in claim 10 wherein one side of said storage capacitor is connected to a terminal common to a modulating element and a sound reproducer, and a switch means is provided for selectively connecting said second inductor to the other terminal of said modulating element and said sound reproducer.

13. In a high frequency transceiver the combination as defined in claim 10 wherein said first parallel resonant circuit includes a portion of said first inductor.

14. In a high frequency radio receiver the combination comprising an antenna circuit adapted to receive and select carrier waves of predetermined frequency within a relatively wide frequency spectrum, a first inductor connecting said antenna circuit to a point of fixed potential, a first parallel resonant circuit coupled to said first inductor and resonant to carrier waves of a first selected frequency, a rectifying element connected to said first resonant circuit, energy storage means including a filter coil and a storage capacitor connected in shunt with said rectifier and said resonant circuit, a semi-conductor device having at least an emitter electrode, a collector electrode and a base electrode, a second parallel resonant circuit resonant to carrier waves of a second selected frequency coupled to said first inductor and connected with said semi-conductor device, and circuit means including a sound reproducer connecting said storage capacitor between said collector electrode and said base electrode.

15. In a high frequency radio receiver, the combination as defined in claim 14 wherein a biasing network including a shunt connected resistor and bypass capacitor is connected between said base electrode and said point of fixed potential, and said circuit means includes a second inductor coupled to said second parallel resonant circuit.

16. In a signal translating system, the combination with a plurality of signal selecting and conveying circuits, of rectifying means in one of said circuits, means for applying a received carrier wave signal to said rectifying means, means including a storage device connected to form a closed loop with said rectifying means and one of said signal selecting circuits for deriving a direct-current rectified signal component from said rectifying means in response to said received carrier wave, a semi-conductor device including a semi-conductive body and a plurality of electrodes cooperatively associated therewith, said device being connected in another of said circuits as an oscillator element therein for generating an oscillator signal, and means connecting said storage device with said electrodes for providing the sole bias supply therefor to render said semi-conductor device operative by said direct current component in response to said received carrier wave signal.

17. In a transceiver, the combination of a carrier wave receiving circuit, carrier wave detecting and rectifying means coupled to said receiving circuit for rectifying and detecting a received carrier wave signal, load means connected with said detecting and rectifying means for reproducing detected carrier wave signals, a storage capacitor connected in circuit with said detecting and rectifying means and said receiving circuit to form a closed unilaterally conducting loop and adapted to be charged by unidirectional current from said rectifying means in response to a received carrier wave signal, an oscillator circuit including a transistor having at least three electrodes, means connecting said capacitor between two of said electrodes of said transistor for applying biasing voltages thereto of a magnitude to generate an oscillator signal, the charge on said capacitor in response to a received carrier wave signal providing the sole biasing supply for said transistor, means for modulating said oscillator signal, and means for transmitting a modulated oscillator signal.

References Cited in the file of this patent

UNITED STATES PATENTS

| | | |
|---|---|---|
| 1,606,775 | Nyman | Nov. 16, 1926 |
| 1,902,235 | Heintz | Mar. 21, 1933 |
| 2,607,004 | Harris | Aug. 12, 1952 |
| 2,644,896 | Lo | July 7, 1953 |
| 2,647,957 | Mallinckrodt | Aug. 4, 1953 |
| 2,777,057 | Pankove | Jan. 8, 1957 |

OTHER REFERENCES

"A Crystal Receiver with Transistor Amplifier," Radio & Television News, January 1950, pp. 38, 39, 153–155.